Sept. 8, 1925.
S. F. JACKES ET AL
1,552,853
PORTABLE OVEN
Filed April 22, 1925
2 Sheets-Sheet 1
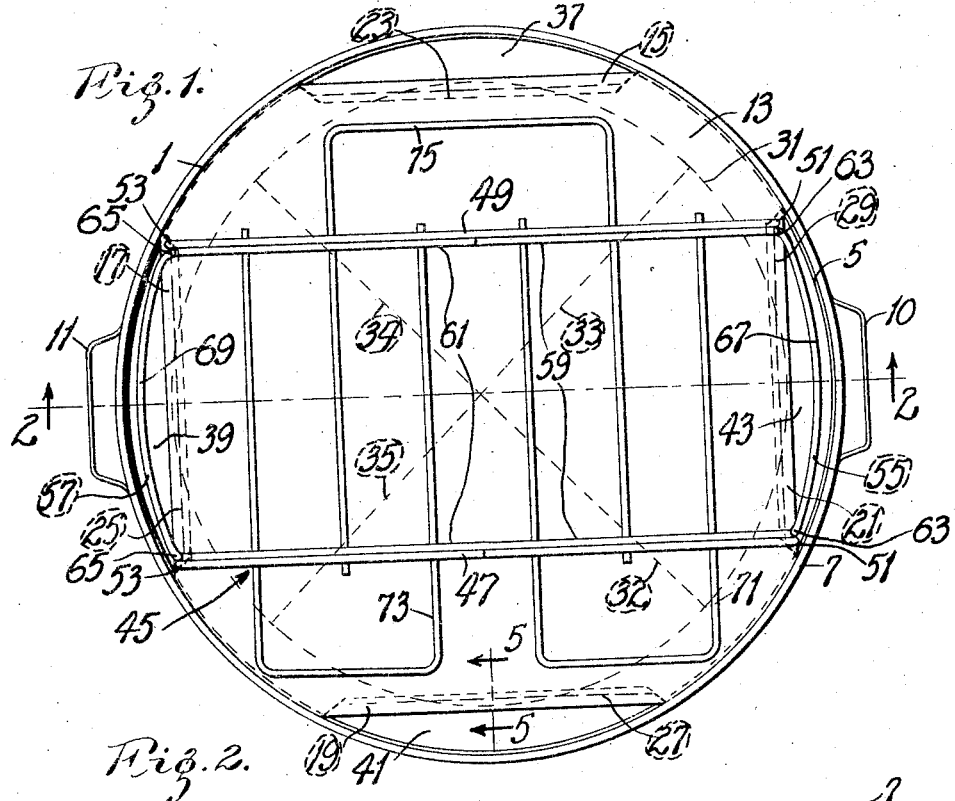
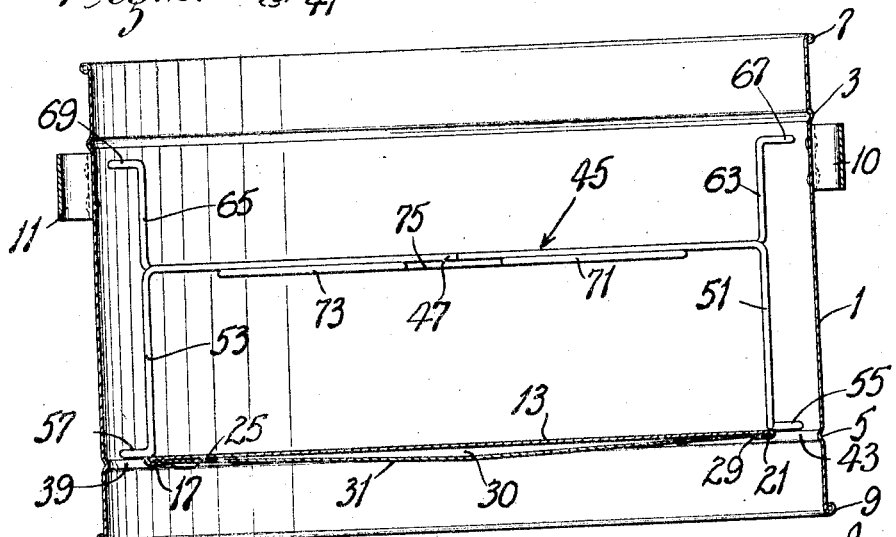
Stanley F. Jackes
William J. Hahn
Inventors,
Delos G. Haynes
Attorney Sept. 8, 1925.
S. F. JACKES ET AL
1,552,853
PORTABLE OVEN
Filed April 22, 1925  2 Sheets-Sheet 2
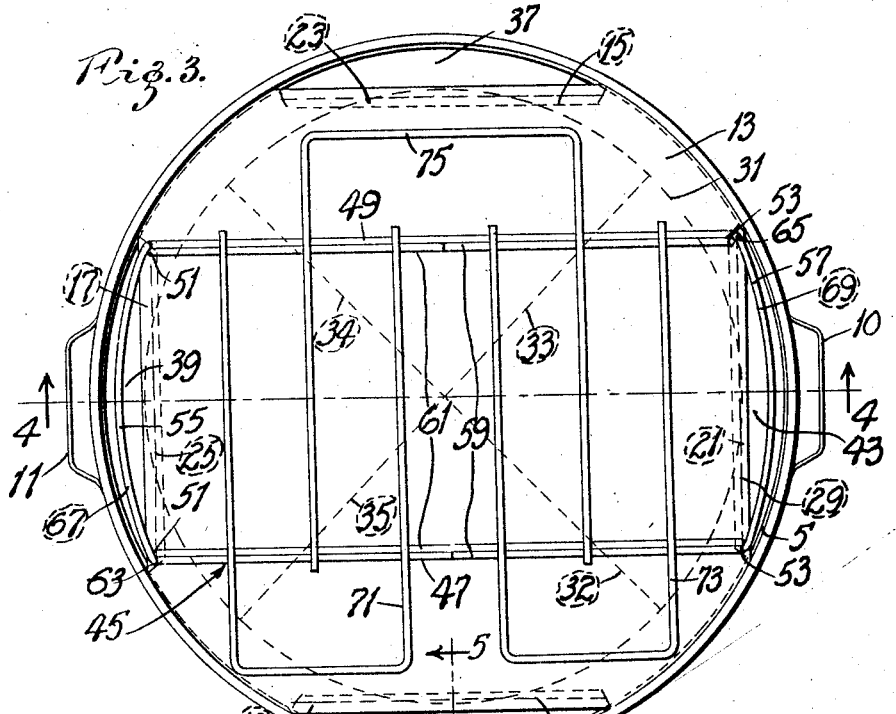
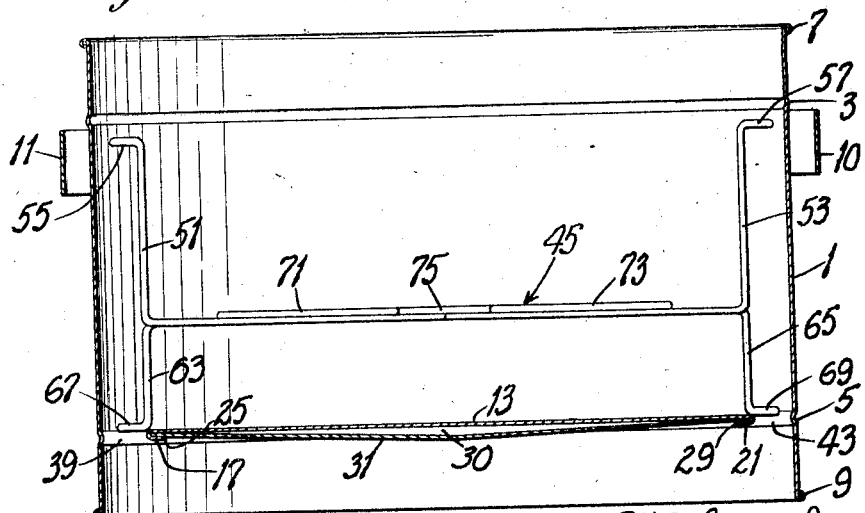

Patented Sept. 8, 1925.

1,552,853

UNITED STATES PATENT OFFICE.

STANLEY F. JACKES AND WILLIAM J. HAHN, OF ST. LOUIS, MISSOURI, ASSIGNORS TO JACKES-EVANS MANUFACTURING COMPANY, OF ST. LOUIS, MISSOURI, A CORPORATION OF MISSOURI.

PORTABLE OVEN.

Application filed April 22, 1925. Serial No. 24,924.

*To all whom it may concern:*

Be it known that we, STANLEY F. JACKES and WILLIAM J. HAHN, both citizens of the United States, and residents of St. Louis, Missouri, have invented an Improvement in Portable Ovens, of which the following is a specification.

This invention relates to ovens and with regard to certain more specific features to portable ovens.

Among the several objects of the invention may be noted the provision of an oven adapted to guard against the burning of materials being heated within the oven; the provision of means for readily and properly positioning within the oven various materials requiring different degrees of heat; and the provision of rugged means for accomplishing the above purposes which shall be adapted to economical manufacture.

The invention accordingly comprises the features of construction, combinations of elements and arrangements of parts which are exemplified in the structure hereinafter described and the scope of the application of which will be indicated in the following claims.

In the accompanying drawings, in which is shown one of various possible embodiments of this invention, Fig. 1 is a top plan view of the oven showing a grid in elevated position therein;

Fig. 2 is a vertical section on the line 2—2 of Fig. 1 showing the rack in elevation;

Fig. 3 is a view similar to Fig. 1 showing the grid in depressed position;

Fig. 4 is a vertical section taken on the line 4—4 of Fig. 3 showing the rack in elevation; and Fig. 5 is an enlarged fragmentary section taken on the line 5—5 of Figs. 1 and 3.

Similar reference characters indicate corresponding parts throughout the several views of the drawings.

Referring now more particularly to Figs. 1 and 2 there is illustrated at 1 a preferably light gage, sheet metal cylinder, beaded circularly in girth at an upper level 3 and also at a lower level 5.

The upper bead 3 is rolled outwardly and the lower bead 5 is rolled inwardly. Both beads serve stiffening purposes. The lower one 5 has other functions to be described.

The cylinder 1 is also provided with outwardly formed stiffening rolls or flanges 7 and 9 at its upper and lower ends respectively. The beads 3 and 5 and rolls 7 and 9 are all integrally formed with the cylinder. The cylinder is preferably provided with a blue-steel finish to prevent corrosion and enhance its appearance.

Oppositely or otherwise fastened to said cylinder 1, are handles or grips 10 and 11 for purposes of lifting and transporting the oven.

The bottom of the oven comprises a substantially circular and flat sheet 13 which has had four oppositely and equally spaced segments removed from the original plane thereof. At the places of removal of said segments, part of the material which comprised the segment, has been turned in under the remainder of the sheet 13 to form strips 15, 17, 19 and 21. These said strips are provided with crimps 23, 25, 27 and 29 respectively on their edges for stiffening purposes (see Figs. 1, 3 and 5). The said crimps are also formed of metal which comprise part of the said segments.

Hence the sheet 13 is adapted to be stamped substantially circularly and then to have the said crimping and under turning operations performed upon it.

The diameter of the blank of the bottom sheet 13 is that of the inside of the cylinder 1. Hence it is adapted to rest upon the lower inwardly formed crimp 5 in the cylinder. The fit between the bottom piece 13 and the cylinder is a snug one that is the piece 13 is sprung into the cylinder, thus preventing spontaneous falling out of the said bottom piece 13, should the cylinder be overturned. However, the bottom may be removed manually with little exertion, for purposes such as cleaning.

The purpose of the crimp-edged, turned down strips 15, 17, 19 and 21 is to hold up against the said bottom piece 13, a slightly pyramidal shaped round sheet 31. The sheet 31 is formed of a circular blank, smaller than the circular blank of the sheet 13. This blank is bent along the four equally spaced radial lines 32, 33, 34 and 35. This bending operation forms the said pyramidal shape. The faces of the pyramidal shape are opposite the openings 37, 39, 41 and 43. By applying this pyramidal shape point downwardly to the bottom of the sheet 13 and turning under said crimped strips 15, 17, 19 and 21, there is attained between the bottom sheet 13 and the circular or pyramidal sheet 31, an air chamber or pocket 30. The sheet 31 forms a sub-bottom.

Upon slipping the bottom 13 and its appended sub-bottom piece 31 down into the cylinder 1 to a seat on the bead 5, there are left four open segmental spaces 37, 39, 41 and 43 between the strips 15, 17, 19 and 21 respectively, and the cylinder wall.

The materials and finish of the bottom 13 and sub-bottom 31 are preferably the same as the material and finish which comprise the said cylinder 1.

The sub-bottom has no motion relative to the bottom 13, in so far as its edges are tangentially arranged with respect to the bottoms of the notches which under-turned strips 15, 17, 19 and 21 form (Figs. 1, 3 and 5). It is also tightly held in position by the said crimp-edged, under-turned strips which may be dull-dozed or otherwise forced into their finished shape. The sub-bottom entirely clears the bead 5.

For purposes of holding contents within the oven there is provided a wire rack 45. The rack 45 comprises six lengths of wire.

One length of wire comprises horizontal side rails 47 and 49 integrally formed with two pairs of downwardly formed vertical end legs 51 and 53. The legs of the end pairs 51, 53 are joined by bows of wire 55 and 57 respectively. The side rails 47, 49, pairs of legs 51, 53, and bows 55, 57, are integrally formed of one length of wire welded end to end at any convenient point.

The radius of the arc on which the bows 55 and 57 are formed is slightly less than the radius of the cylinder 1 and the length of the rack parts is such as to permit dropping the rack into the oven without excessive room for play between the rack and cylinder.

The bows 55 and 57 subtend a greater angle on their radius circle than the edges of the openings 37, 39, 41 and 43 subtend on their radius circle, so that the pairs of legs 51 and 53 can not fall through the said openings in any position of the rack. The last named result may be accomplished in other ways.

Formed next to the said side rails 47 and 49 are the two pairs of end lengths 59 and 61 of pairs of upwardly extending arms 63 and 65 respectively. The pairs of arms 63 and 65 have their units joined by bows of wire 67 and 69 respectively.

The pair of end lengths 59, the pair of upwardly extending arms 63 and the bow 67 are integrally formed of one piece of wire, brazed, welded or otherwise fastened to the side rails 47 and 59 along the end lengths 59.

Likewise the pair of end lengths 61, the pair of upwardly extending arms 65 and the bow 69 are integrally formed of one piece of wire, brazed, welded or otherwise fastened to the side rails 47 and 59 along the end lengths 61.

The pairs of arms 63, 65 and the bows 67, 69 have the same general shape as the pairs of legs 51, 53, and bows 55, 57, except that the said arms are shorter in length than the said legs.

Under the side rails 47 and 49 are welded or otherwise fastened, three U-shaped wire lengths 71, 73 and 75. Two of the U-shaped lengths 71 and 73 are shaped alike and are set out to one side when their legs are fastened to the side rails.

The other U-shaped length 75 is of wider construction and extends out to the other side of the rails when its legs are fastened thereto. The legs of the U-shape 75 fall within the interior of the said U-shapes 71 and 73, preferably centrally thereof.

Hence a grid is formed which is adapted to cover efficiently, the interior horizontal projected area of the oven. Referring to Figs. 1 and 2 it is evident that the rails 47, 49 and the U-shaped pieces form a shelf-like grid for holding material in the oven and that said grid is held up from the bottom of the oven by means of legs 51 and 53. The arms 63 and 65 with bows 67 and 69 form a pair of curved handles for lifting the rack 45 out from the oven.

Now, should it be desired to place the articles within the oven down closer to the oven bottom, it would only be necessary to remove the rack 45 from its position shown in Figs. 1 and 2, invert the rack and replace it, arms down in the oven, as illustrated in Figs. 3 and 4. This inversion causes the formerly extending arms 63 and 65 to extend downwardly and become legs for holding up the said rails and grid portions. It is to be remembered that the arms and their bows have the same shape as the now upwardly extending legs and their bows, but that said arms are shorter than said legs.

Hence the materials or objects to be placed within the oven, may be set at a lower level and in closer proximity to the hot bottom by this inversion.

The U-shaped grid pieces are now located above the rails and the former legs 51, 53 with their bow pieces 55 and 57 become curved handles by means of which the rack 45 and objects thereon may be lifted from the oven.

It can be seen that by means of this inverting rack, articles may be placed at advantageous points within the oven. Some articles may require slow heating at lower temperatures while others require fast heating at higher temperatures.

A high position of the grids fulfills the former condition while a low position fulfills the latter.

The purpose of the four openings 37, 39, 41 and 43 is to give a good lateral distribution of heat throughout the oven instead of having the heat concentrated at such a point as the fire happens to be beneath.

The inverted pyramidal shape of the sub-bottom 31, obviously aids the distribution of heat by conducting it to the openings. The sub-bottom also protects the bottom 13 from the intense radiant heat of the fire and thereby prevents localization of heat in the oven. Consequently the possibility of burning objects within this oven is materially reduced.

It is to be understood that a lid may be used in connection with this oven.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

We claim:

1. A portable oven comprising a cylindrical chamber, a lower inwardly rolled girth crimp therein, and a ported double bottom adapted to rest on said lower crimp said double bottom comprising a flat sheet, a four faced pyramidally formed, circularly shaped sheet adapted to be fastened to said flat sheet by under-turned strips on said flat sheet, said strips being adapted by their displacement to form four ports in the flat sheet opposite the said four faces of the pyramidal sheet.

2. A portable oven comprising a cylindrical chamber, a lower inwardly rolled girth crimp therein, and a ported double bottom adapted to rest on said lower crimp said double bottom comprising a flat sheet, a multifaced pyramidally formed, circularly shaped sheet adapted to be fastened to said flat sheet by under-turned strips on said flat sheet, said strips being adapted by their displacement to form a multiple number of ports in the flat sheet opposite the said faces of the pyramidal sheet.

3. A portable oven comprising a cylinder, a bottom therefor ported sidewardly at four points, said bottom forming in conjunction with said cylinder a fire chamber below and a heat chamber above said bottom, means depending from said bottom comprising four integrally formed faces adapted to protect said bottom from radiant heat and to evenly deflect heat from said fire chamber up to the heat chamber through said ports.

4. A portable oven comprising a cylinder, a bottom therefor ported sidewardly at four points, said bottom forming in conjunction with said cylinder a fire chamber below and a heat chamber above said bottom, means depending from said bottom comprising four integrally formed faces adapted to protect said bottom from radiant heat and to evenly deflect heat from said fire chamber up to the heat chamber through said ports and an invertible rack within said upper chamber having two arms and two legs and a horizontal grid, said legs and arms being shaped alike but the legs being longer than the arms so that the grid may be set at either of two elevations by proper inversion of the rack.

5. A portable oven comprising a cylinder, a bottom therefor ported sidewardly at four points, said bottom forming in conjunction with said cylinder a fire chamber below and a heat chamber above said bottom, means depending from said bottom comprising four integrally formed faces adapted to protect said bottom from radiant heat and to evenly deflect heat from said fire chamber up to the heat chamber through said ports and an invertible rack within said upper chamber having two arms and two legs and a horizontal grid, said legs and arms being shaped alike but the legs being longer than the arms so that the grid may be set at either of two elevations by proper inversion of the rack either the arms or legs being used as lifting handles for said rack.

In testimony whereof, we have signed our names to this specification this 20th day of April, 1925.

STANLEY F. JACKES.
WILLIAM J. HAHN.